Patented Aug. 24, 1954

2,687,428

UNITED STATES PATENT OFFICE 2,687,428

PROCESS OF PREPARING ACONITATE FUMARATE ADDUCTS

Joachim Dazzi, Dayton, Ohio, assignor to Monsanto Chemical Company, St. Louis, Mo., a corporation of Delaware No Drawing. Application May 24, 1951,
Serial No. 228,113

2 Claims. (Cl. 260—485)

The present invention relates to organic compounds and deals more particularly with addition products of dialkyl fumarates and trialkyl aconitates, to methods of preparing the same, and to vinyl chloride polymers plasticized with the addition products.

According to the invention there are provided new and valuable polycarboxylates in which one mole of a dialkyl fumarate in which each alkyl radical has from 1 to 4 carbon atoms is combined with one mole of a trialkyl aconitate in which each alkyl radical has from 1 to 4 carbon atoms. The new polycarboxylates are formed by a simple addition reaction, in which one mole of the fumarate adds to one mole of the aconitate. While the structure of the 1:1 adducts thus formed cannot be definitely determined, the adducts are believed to be penta-alkyl 1-pentene-1,2,3,4,5-pentacarboxylates, the addition reaction proceeding probably according to the scheme:

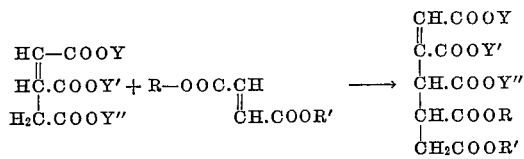

in which Y, Y', Y'', R and R' are alkyl radicals of from 1 to 4 carbon atoms.

Dialkyl fumarates and trialkyl aconitates useful for the preparation of the present adducts are esters in which the alcohol portion of the molecule is derived from one alcohol, i. e., the diethyl, di-isopropyl, or di-n-butyl fumarates and the trimethyl, tri-n-propyl or triisobutyl aconitates, or mixed esters such as ethyl methyl fumarate, propyl diethyl aconitate, butyl ethyl fumarate, etc.

The addition reaction is effected simply by heating the fumarate with the aconitate at a temperature of at least 200° C. until formation of the 1:1 adduct has occurred. The heating temperature may be from 200° C. to 300° C., depending upon the nature of the individual reactants; it should not exceed a temperature at which either reactant is decomposed. Refluxing temperatures of the reaction mixture are preferred. Termination of the reaction is generally evidenced by noting cessation in rise of the refluxing temperature. The course of the reaction may also be followed by noting the change in the refractive index of the reaction mixture.

Since the present products are formed by the addition of one mole of the fumarate to one mole of the aconitate molar equivalents of the reactants may be advantageously employed in the reaction mixture. However, since any unreacted materials may be readily recovered from the reaction product, an excess of either reactant may be used; and in order to assure complete reaction of the less readily available aconitates, it is generally preferred to use an excess of the dialkyl fumarate in the initial reaction mixture. An excess of the fumarate also serves as a diluent for the reaction.

The present adducts are stable, high-boiling polycarboxylates which range from clear, viscous liquids to waxy solids. They are advantageously used for a variety of industrial purposes, and are characterized by conferring improved plasticity to synthetic resins and plastics when incorporated therein. They impart increased flexibility to vinyl chloride polymers, which flexibility is retained at even low temperatures. At high temperatures, the present adducts are not readily volatilized from the plasticized composition, even when present in concentrations of up to 50% by weight.

The invention is further illustrated, but not limited, by the following examples.

Example 1

A mixture consisting of 258.1 g. (1 mole) of triethyl aconitate and 342.76 g. (2 moles) of diethyl fumarate was heated at refluxing temperature (220° C.) for 3 hours and then for about 15 hours at a temperature of from 201–190° C. The drop in temperature indicated the presence of a low boiling material, which was distilled off, so the mixture was refluxed for an additional 12 hours, at the end of which time the temperature was 249° C. Distillation of the resulting reaction product to a temperature of 200° C./0.5 mm., removed unreacted material and further distillation gave 63.7 g. of an adduct in which one mole of triethyl aconitate is combined with one mole of diethyl fumarate (probably pentaethyl 1-pentene-1,2,3,4,5-pentacarboxylate), B. P. 200–220° C./0.5 mm., $N_D^{25}$ 1.4690 having a free acid content of 2.99% (calculated as the pentacarboxylic acid).

Example 2

60 parts of polyvinyl chloride and 40 parts by weight of the adduct of Example 1 were mixed on a rolling mill to a homogeneous blend. During the milling there was observed substantially no fumes and discoloration. A molded sheet of the mixture was clear, transparent and substantially colorless. Testing of the molded sheet by the Clash-Berg method gave a low temperature flexibility value of 3.0° C. Tests on the volatility characteristics of the plasticized composition employing the method described by the American Society for Testing Materials under the designation D-744-44T gave a volatility value of 2.9 per cent. When subjected to a heat of 225° F. for a period of 30 minutes the clarity and color of the molded product were substantially unchanged.

While the above example shows only compositions in which the ratio of plasticizer to polymer content is 40:60, this ratio being employed in order to get comparable efficiencies, the content of adduct to polyvinyl chloride may be widely varied, depending upon the properties desired in the final product. For many purposes a plasticizer content of, say, from only 10 per cent to 20 per cent is preferred. The present adducts are compatible with polyvinyl chloride over wide ranges of concentrations, up to 50 per cent of esters based on the total weight of the plasticized composition yielding desirable products.

Although the invention has been described particularly with reference to the use of the present adducts as plasticizers for polyvinyl chloride, they are advantageously employed also as plasticizers for copolymers of vinyl chloride, for example, the copolymers of vinyl chloride with vinyl acetate, vinylidene chloride, etc. Preferably, such copolymers have a high vinyl chloride content, i. e., a vinyl chloride content of at least 70 per cent by weight of vinyl chloride and up to 30 per cent by weight of the copolymerizable monomer.

The plasticized polyvinyl halide compositions of the present invention have good thermal stability; however, for many purposes it may be advantageous to use known stabilizers in the plasticized compositions. Inasmuch as the present adducts are substantially unreactive with the commercially available heat and light stabilizers which are commonly employed with polyvinyl chloride or copolymers thereof, the presence of such materials in the plasticized materials does not impair the valuable properties of the present esters. The present adducts are of general utility in softening vinyl chloride polymers. They may be used as the only plasticizing component in a compounded vinyl chloride polymer or they may be used in conjunction with other plasticizers.

What I claim is:

1. The method which comprises heating at a temperature of at least 200° C., a trialkyl aconitate in which each alkyl radical has from 1 to 4 carbon atoms with a dialkyl fumarate in which each alkyl radical has from 1 to 4 carbon atoms, and recovering from the resulting reaction product an adduct in which 1 mole of the said aconitate is combined with 1 mole of said fumarate.

2. The method which comprises heating, at a temperature of at least 200° C., a mixture of triethyl aconitate and diethyl fumarate and recovering from the resulting reaction product an adduct in which 1 mole of the aconitate is combined with 1 mole of the fumarate.

References Cited in the file of this patent

UNITED STATES PATENTS

| Number | Name | Date |
|---|---|---|
| 2,472,135 | Weizmann | June 7, 1949 |
| 2,485,099 | Karasch | Oct. 18, 1949 |
| 2,503,401 | Mattano et al. | Apr. 11, 1950 |
| 2,509,199 | Moore | May 30, 1950 |
| 2,517,351 | Reid | Aug. 1, 1950 |
| 2,526,395 | Nichols | Oct. 17, 1950 |
| 2,555,595 | Morris | June 5, 1951 |